(12) United States Patent
Bourcier

(10) Patent No.: US 7,706,128 B2
(45) Date of Patent: Apr. 27, 2010

(54) CAPACITIVE DEVICE

(75) Inventor: Roy Joseph Bourcier, Corning, NY (US)

(73) Assignee: Corning Incorporated, Corning, NY (US)

( * ) Notice: Subject to any disclaimer, the term of this patent is extended or adjusted under 35 U.S.C. 154(b) by 386 days.

(21) Appl. No.: 11/947,109

(22) Filed: Nov. 29, 2007

(65) Prior Publication Data
US 2009/0141422 A1 Jun. 4, 2009

(51) Int. Cl.
*H01G 9/00* (2006.01)
(52) U.S. Cl. .................. 361/502; 361/503; 361/504; 361/508; 361/512; 361/523
(58) Field of Classification Search .......... 361/502, 361/503–504, 508, 509, 512, 516–519, 523–525, 361/528–529
See application file for complete search history.

(56) References Cited

U.S. PATENT DOCUMENTS

| 5,954,937 | A | 9/1999 | Farmer ................... 1/461 |
| 6,214,204 | B1 | 4/2001 | Gadkaree et al. ........... 1/46 |
| 6,426,862 | B1 * | 7/2002 | Vasechkin et al. ........ 361/502 |
| 6,426,865 | B2 * | 7/2002 | Kasahara et al. ......... 361/512 |
| 6,697,249 | B2 * | 2/2004 | Maletin et al. .......... 361/502 |
| 6,778,378 | B1 | 8/2004 | Andelman ................ 4/35 |
| 6,862,168 | B2 * | 3/2005 | Ando et al. ............. 361/504 |
| 6,885,545 | B2 * | 4/2005 | Michel et al. ........... 361/502 |

* cited by examiner

*Primary Examiner*—Nguyen T Ha
(74) *Attorney, Agent, or Firm*—Tina N. Thompson

(57) ABSTRACT

Capacitive devices are described having electrical interconnects of electrodes which possess efficient electrical contact between current collectors, electrical isolation of electrodes, and/or electrochemical stability, while minimizing the mechanical stress and strain applied to the electrodes. The capacitive devices are adaptable to a wide range of electrode diameters and electrode stack lengths.

21 Claims, 3 Drawing Sheets

CAPACITIVE DEVICE

BACKGROUND

1. Field of the Invention

The present invention relates generally to a capacitive device and more particularly to a capacitive device comprising an electrical interconnect useful for electric double layer capacitors and/or for capacitive deionization.

2. Technical Background

Capacitors, like batteries, store energy in the electrical field between a pair of oppositely charged conductive plates. Developed more than 250 years ago, capacitors are frequently used in electrical circuits as energy storage devices. In recent years, new families of capacitive devices have been developed which are based on charge separation of ions in solution and the formation of electrical double layers.

An electric double layer capacitor (EDLC) is an example of a capacitor that typically contains porous carbon electrodes (separated via a porous separator), current collectors and an electrolyte solution. When electric potential is applied to an EDLC cell, ionic current flows due to the attraction of anions to the positive electrode and cations to the negative electrode. Electric charge is stored in the electric double layer (EDL) formed along the interface between each polarized electrode and the electrolyte solution.

EDLC designs vary depending on application and can include, for example, standard jelly roll designs, prismatic designs, honeycomb designs, hybrid designs or other designs known in the art. The energy density and the specific power of an EDLC can be affected by the properties thereof, including the electrode and the electrolyte utilized. With respect to the electrode, high surface area carbons, carbon nanotubes, activated carbon and other forms of carbon and composites have been utilized in manufacturing such devices. Of these, carbon based electrodes are used in commercially available devices.

Capacitive Deionization (CDI) is a promising deionization technology, for instance, for the purification of water. In this context, positively and negatively charged electrodes are used to attract ions from a stream or bath of fluid. The ions form electric double layers on the surfaces of the electrodes, which are fabricated from some form of high surface area material, for example, a form of activated carbon. After interaction with the electrodes during the charging period, the fluid contains a lower overall ion content and is discharged. A volume of purge fluid is then introduced to the electrodes. The electrodes are then electrically discharged, thus releasing the trapped ions into the purge fluid. The purge fluid is then diverted into a waste stream and the process repeated.

Electrically connecting electrodes to a power source is a challenging aspect for EDLC and CDI applications. Typically, electrodes are delicate, thus mechanical stressing and straining of the electrodes should be minimized. Minimizing the deformations applied to the electrodes is difficult, especially while attempting to maximize the electrical and mechanical integrity of an electrical interconnect to the electrodes.

U.S. Pat. No. 5,954,937 relates to an interconnection for resorcinol/formaldehyde carbon aerogel/carbon paper sheet electrodes. The fluid flow path is located between the surfaces of the electrode sheets. The active surfaces of these electrode sheets are delicate and should be protected from mechanical stressing. The electrode sheets are bonded to a current collector, in this case, a titanium sheet using a conductive carbon filled adhesive. The large area of contact between the electrode sheet and the current collector insure relatively low overall resistance despite the moderately high resistivity of the adhesive interface.

U.S. Pat. No. 6,778,378 relates to electrodes which may be rolled from carbon and fibrillated polytetrafluoroethylene (PTFE). Electrodes formed in this fashion are thin flexible sheets which can be contacted by high normal compressive forces. Electrodes may be stacked up with sheets of current collector material and a separator material and then clamped with a compressive force to obtain good electrical contact. By controlling which electrodes and current collectors are in physical contact, a capacitive cell may be formed.

A flow-through (rather than parallel plate) flow geometry is described in commonly owned U.S. Pat. No. 6,214,204. In this reference, monolithic, low back pressure porous electrodes are made by one of several methods, which include honeycomb extrusion, casting or molding from a phenolic resin-based batch. After curing, these parts are carbonized and activated to create high surface area carbon monoliths with good electrical conductivity.

Discs are made and assembled in a stack and spaced such that the discs are electrically isolated from each other. The discs are connected to anode and cathode current collector/bus bar assemblies utilizing wires.

A variety of other approaches to electrically interconnecting electrodes have been considered in the art with one or more disadvantages as described below. Brazing or soldering alloys typically will not withstand either the EDLC or the CDI electrochemical environments. Brazing and/or soldering to carbon is difficult due, in part, to the low strength of activated carbon. Conductive adhesives formulated using highly conductive metal powders are costly and/or are prone to corrosion. Conductive adhesives formulated using carbon powders generally have insufficient electrical conductivity for use in a capacitor.

Conductive wire or strip leads mechanically fastened around the perimeter of a capacitive device provide adequate performance for small electrodes. However the resistive losses introduced by conducting charge around the circumference of the electrode in a small diameter wire or thin strip lead degrade performance, and no simple means has been found to use this attachment scheme while incorporating a high efficiency current collector. Also, the logistics of attaching leads to individual electrodes are not appealing.

It would be advantageous to have a capacitive device comprising an electrical interconnect to a linear stack of electrodes, which does not jeopardize the mechanical integrity of the electrodes. Also, it would be advantageous to have the electrical interconnect be electrochemically inert. Further, it would be advantageous to develop a capacitive device, comprising interconnected monolithic high surface area carbon electrodes, which is capable of non-impeded fluid flow through the electrodes, which is useful for, for example, CDI.

SUMMARY

Capacitive devices, as described herein, address one or more of the above-mentioned disadvantages of conventional capacitive devices and provide one or more of the following advantages: efficient electrical contact between current collectors, electrical isolation of electrodes, electrochemical stability, while minimizing the mechanical stress and strain applied to the electrodes. The capacitive devices of the present invention are adaptable to a wide range of electrode diameters and electrode stack lengths.

One embodiment of the invention is a capacitive device comprising two or more electrodes arranged in series. Each electrode comprises a first face, an opposing second face and a thickness defined by an outer surface extending from the first face to the opposing second face. A first current collector is in electrical contact with the outer surfaces of one or more of the electrodes and insulated from one or more other electrodes through contact with a compliant material disposed between the first current collector and the outer surfaces of one or more other electrodes. A second current collector is in electrical contact with one or more of the electrodes insulated from the first current collector.

Additional features and advantages of the invention will be set forth in the detailed description which follows, and in part will be readily apparent to those skilled in the art from the description or recognized by practicing the invention as described in the written description and claims hereof, as well as the appended drawings.

It is to be understood that both the foregoing general description and the following detailed description are merely exemplary of the invention, and are intended to provide an overview or framework for understanding the nature and character of the invention as it is claimed.

The accompanying drawings are included to provide a further understanding of the invention, and are incorporated in and constitute a part of this specification. The drawings illustrate one or more embodiment(s) of the invention and together with the description serve to explain the principles and operation of the invention.

BRIEF DESCRIPTION OF THE DRAWINGS

The invention can be understood from the following detailed description either alone or together with the accompanying drawing figures.

FIG. 4a is an exploded view schematic of an electrode for a capacitive device according to one embodiment of the invention.

FIG. 4b is an unexploded schematic of the electrode shown in FIG. 4a.

DETAILED DESCRIPTION

Reference will now be made in detail to various embodiments of the invention, examples of which are illustrated in the accompanying drawings. Wherever possible, the same reference numbers will be used throughout the drawings to refer to the same or like parts.

Figure 1:
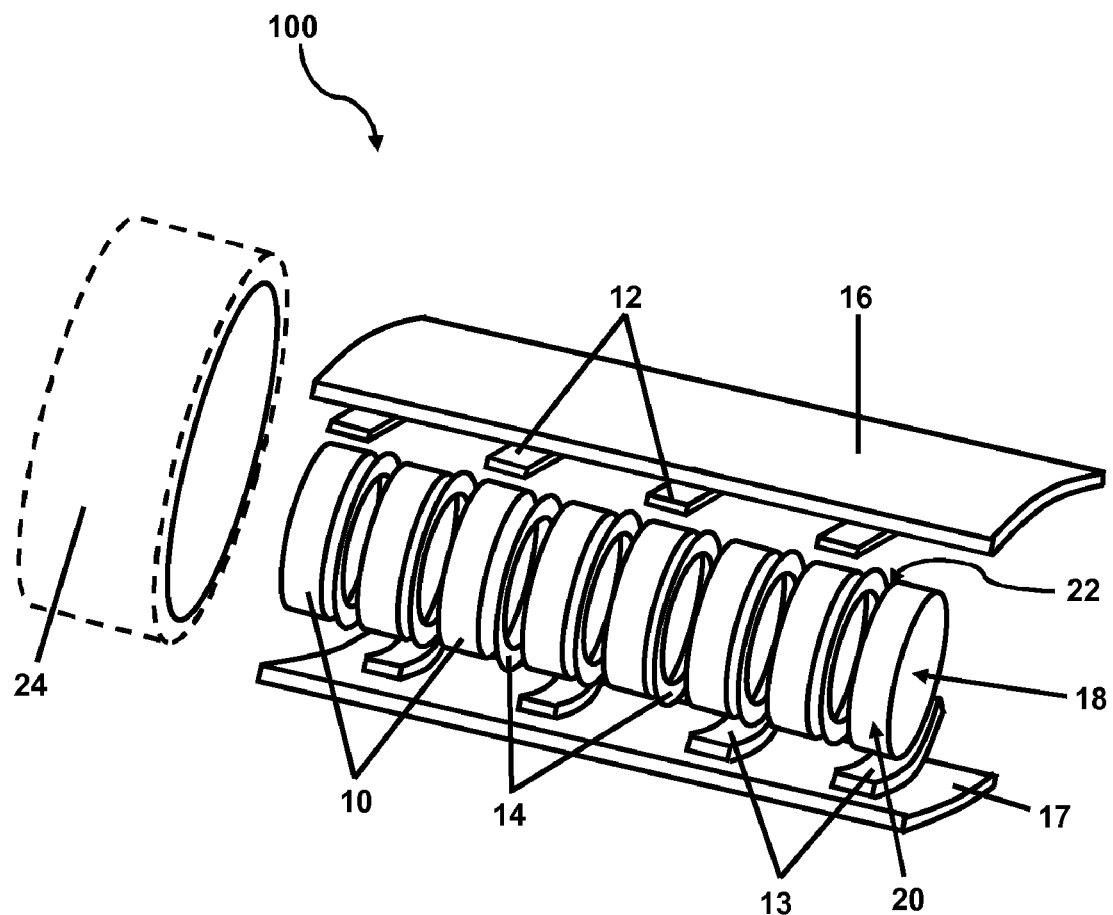
FIG. 1 is an exploded view schematic of a capacitive device according to one embodiment of the invention.
Figure 2:
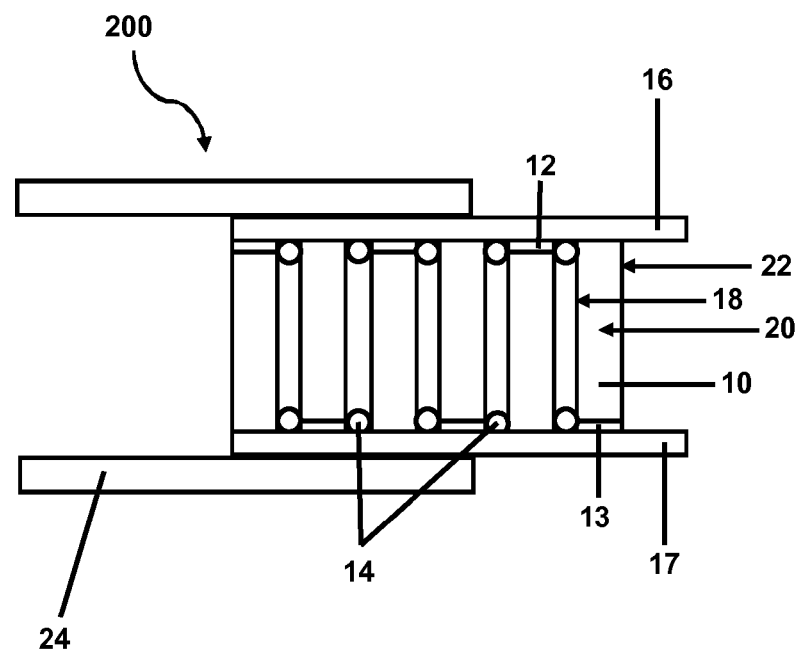
FIG. 2 is a cross-sectional schematic of a capacitive device according to one embodiment of the invention.

One embodiment of the invention is a capacitive device, as shown in FIG. 1 and FIG. 2. The capacitive device 100 and 200, as shown in FIG. 1 and FIG. 2 respectively, comprises two or more electrodes 10 arranged in series. Each electrode comprises a first face 18, an opposing second face 22 and a thickness defined by an outer surface 20 extending from the first face to the opposing second face. A first current collector 16 is in electrical contact with the outer surfaces of one or more of the electrodes and insulated from one or more other electrodes through contact with a compliant material 12 disposed between the first current collector and the outer surfaces of the one or more other electrodes. A second current collector 17 is in electrical contact with one or more of the electrodes insulated from the first current collector.

In one embodiment, as shown in FIG. 1 and FIG. 2, the second current collector 17 is insulated from one or more electrodes contacting the first current collector through contact with a compliant material 13 disposed between the second current collector and the one or more electrodes contacting the first current collector.

According to one embodiment, the first current collector and the second current collector are, independently, a material selected from nickel, carbon, graphite, titanium, aluminum, nickel, copper, silver, gold, platinum and combinations thereof. The first current collector and the second current collector can be in the form of a compliant sheet or foil.

According to some embodiments, the capacitive device comprises more than two electrically conductive sheets or strips as current collectors, wherein a portion of the sheets or strips carrying the same electrical charge contact the same alternating electrodes and the remainder of the sheets or strips carrying the opposite electrical charge contact alternating electrodes which are not in contact with the first portion of the multiple sheets or strips, thus forming a series of electrodes carrying alternating charges.

When the first current collector carries, for example, a positive charge and the second current collector carries, for example, a negative charge, these above-mentioned configurations can be used to form a capacitive device having a series of alternating anodes and cathodes.

According to one embodiment, the current collector is a material selected from nickel, carbon, graphite, titanium, aluminum, nickel, copper, silver, gold, platinum and combinations thereof. In one embodiment, the current collector is a compliant sheet, for example, an electrically conductive foil. Alternatively, the current collector is, for example, a rigid plate.

In a parallel plate capacitive device, electrodes are arranged in series such that at least a portion of the opposing second face of the first electrode and at least a portion of the first face of a second electrode are adjacent to each other.

In a flow-through capacitive device, electrodes are arranged in series from upstream to downstream such that at least a portion of a fluid conveyed through the first face of a first electrode is subsequently conveyed through at least a portion of the opposing second face of the first electrode and at least a portion of the fluid is subsequently conveyed through at least a portion of the first face of a downstream second electrode.

Figure 3A:
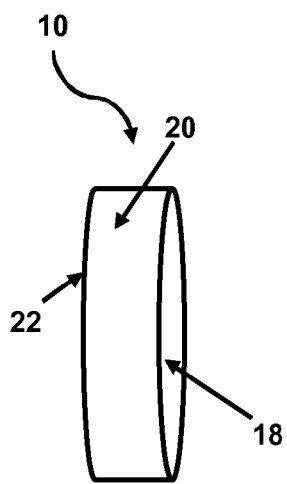
FIG. 3a, FIG. 3b and FIG. 3c show features of a capacitive device according to one embodiment of the invention.
Figure 3B:
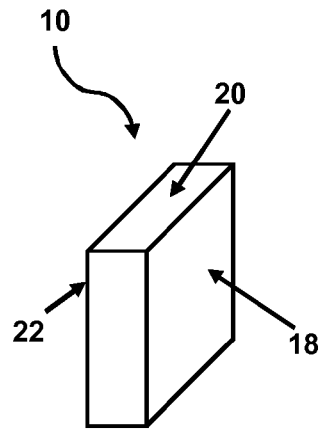
Figure 3C:
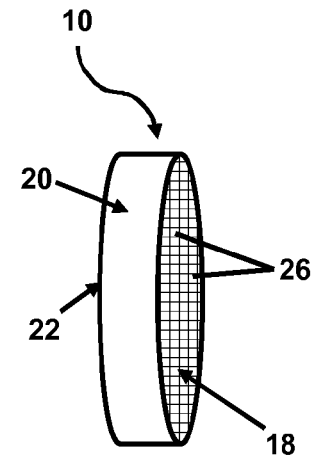

The electrodes, as shown in FIG. 3a, FIG. 3b and FIG. 3c can be any shape or size providing the electrode 10 comprises a first face 18, an opposing second face 22 and a thickness defined by an outer surface 20 extending from the first face to the opposing second face. An electrode, as shown in FIG. 3b, having flattened areas on the outer surface may facilitate improved electrical connections to a current collector also having a surface with flattened areas contacting the electrodes. The electrodes can be, for example, polygonal, circular, cylindrical, square, cubed, triangular, pentagonal, hexagonal or a combination thereof.

In one embodiment, the electrode material is selected from a carbon, a carbon-based composite, a carbon-based laminate, a conductive metal oxide and combinations thereof. As shown in FIG. 3c, each of the electrodes can comprise a plurality of inner channels 26 having surfaces defined by porous walls and extending through the electrode 10 from the first face 18 to the second face 22, for example, each electrode can be in the form of a honeycomb monolith.

Figures 4A, 4B:
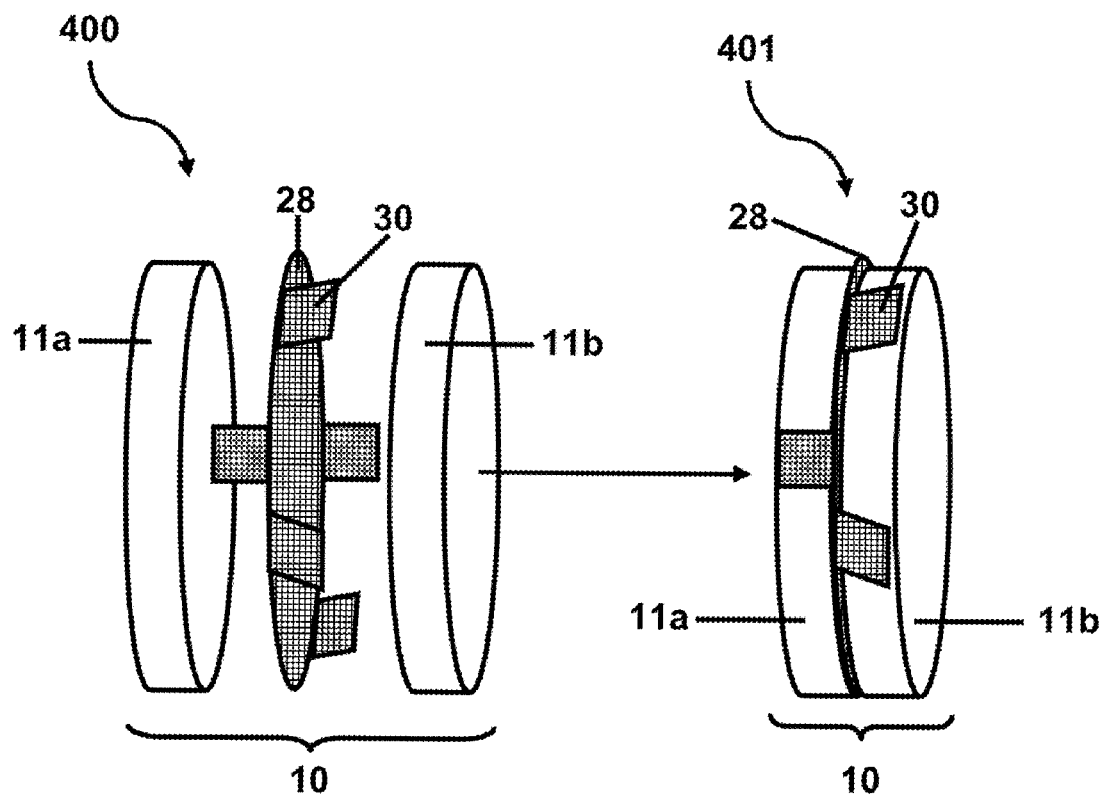

Features 400 and 401 of an electrode for a capacitive device according to the invention are shown in an exploded view in FIG. 4a and in an unexploded view in FIG. 4b respectively. The electrodes 10 comprise two halves 11a and 11b having an electrically conductive porous backplane 28 disposed between and mechanically attaching the two halves. The two halves can be mechanically attached, for example, via bendable tabs 30. The porous backplane can be, for example, a wire mesh. In one embodiment, the wire mesh is a material selected from titanium, aluminum, nickel, copper, silver, gold, platinum and combinations thereof.

In flow-through capacitive devices, the porous backplane can be, for example, a punched, slit or etched sheet, a woven or nonwoven fabric or some other form of permeable electrically conductive sheet to allow water to flow-through the electrode stack. For large diameter electrodes, or electrode materials having modest electrical conductivity, the backplane can shorten the electrical conduction distance within the electrode.

According to one embodiment, the compliant material covers from 25 percent to 75 percent of the outer surface of each electrode on which it is disposed.

In one embodiment of the capacitive device, the outer surface of the electrodes are circular and the compliant material covers from 45 degrees to 315 degrees of the circumference, for example from 60 degrees to 180 degrees of the circumference of the outer surfaces.

In one embodiment, the compliant material for each electrode in a pair of adjacent electrodes is oriented on diametrically opposed portions of the electrodes with respect to each other.

The compliant material can be selected from a sheet, a bead, a film and combinations thereof. The compliant material, according to one embodiment, is selected from a silicone, an elastomer, natural rubber, silicone rubber, butyl rubber, polybutadiene, nitrile rubber, polyurethane rubber, fluoroelastomers and combinations thereof.

The compliant material distributes the mechanical load and provides a very benign stress environment between the electrodes and the opposite polarity current collector. The contact between the electrode and the like-charged current collector is somewhat more highly stressed. This stress may be reduced through use of a large contact area, using a "soft" current collector material such as Grafoil, and/or by using a thin, flexible current collector, for example, foil allowing the foil to conform to the electrode and distribute load.

According to one embodiment of the invention, as shown in FIG. 1 and FIG. 2, an electrically insulating spacer 14 is disposed between each adjacent electrode pair. The electrically insulating spacer can be, for example, selected from a ring, a plurality of discrete discs, a grid and combinations thereof. In some embodiments, the electrically insulating spacer can be bonded to the electrode, for example molded to or adhesively attached to the outer surface of the electrode. It is advantageous that the electrically insulating spacer does not appreciably restrict fluid flow along the axis of the two or more adjacent electrodes in a flow-through capacitive device.

The electrically insulating spacer, according to some embodiments, is a rigid material and can be formed, for example by injection molding, machining or by other methods known in the art.

According to another embodiment, the electrically insulating spacer is made of a compliant material. Compliant spacers, for example, silicone further protect the electrodes from mechanical damage.

Another embodiment is a capacitive device as shown in FIG. 1 and FIG. 2, the capacitive device further comprises an outer housing 24 for applying a compressive force to the outer surfaces of the two or more electrodes, the current collector, and the compliant material.

By applying diametrical mechanical compressive force, it is possible to achieve an efficient electrical attachment between the current collectors and their respective electrodes while electrically insulating the anodes from the cathodes, thus creating an interdigitated capacitive device.

The mechanical compressive force can be achieved in a capacitive device, for example, through the use of adjustment screws, bolts, springs, close mechanical tolerances or other means which should be obvious to those skilled in the art of packaging.

Example 1

In this example, the capacitive device comprises a linear stack of carbon honeycomb electrodes, which can be charged with alternating polarity.

A compliant insulating material is used to manage mechanical stress and provide selective electrical isolation to the electrodes within the linear stack. Two (or more) simple strips of conductive foil are used to provide current collector/bus bar functionality to the electrodes in the linear stack. Through the application of diametrical compressive stress, a good electrical connection is made between the current collectors and electrodes.

Figure 5:
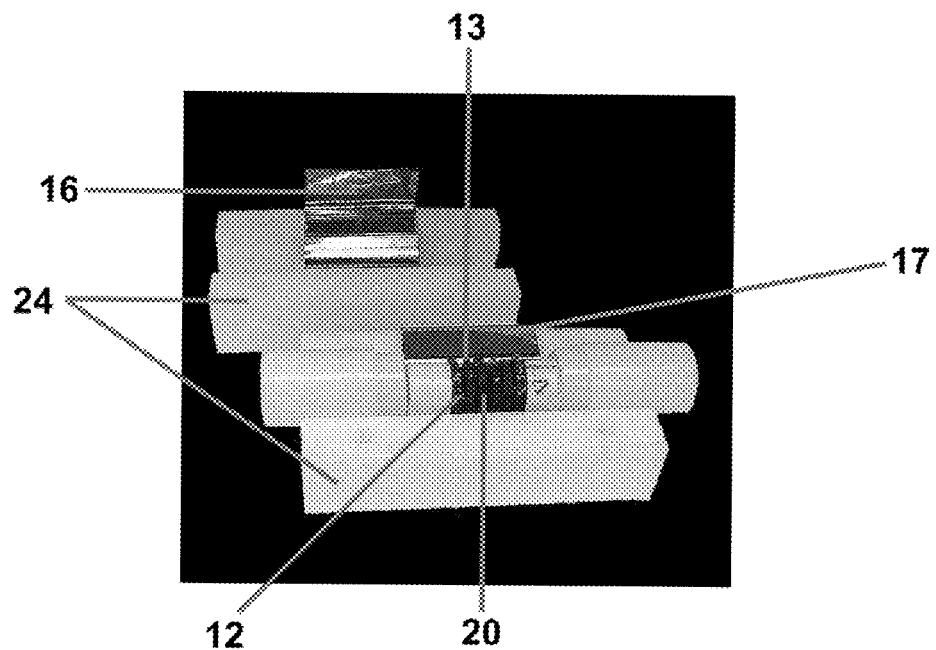
FIG. 5 is a capacitive device according to one embodiment of the invention.

FIG. 5 is a capacitive device, according to one embodiment. A rigid outer housing 24 was used to contain the linear electrode stack comprising honeycomb electrodes and current collector sheets. The outer housing containing concave cylindrical grooves was used to apply distributed mechanical compressive force to the current collector/electrode interfaces.

Current collectors 16 and 17 were made from both commercially available pure nickel foil and Grafoil (conductive carbon sheet material). The compliant material 12 and 13, in this embodiment, a silicone sealant, was applied as a bead to ~90 degrees of the outer surface 20 of each electrode. The electrically insulating spacer, in this embodiment, is several small dots of silicone sealant on either the first face or the opposing second face of each electrode. Other means could be used to provide mechanical compliance and electrical isolation functions, such as strips of silicone sheet adhesively attached to the outer surfaces of the electrodes or to the faces of the electrodes.

The electrodes were immersed in 1500 ppm aqueous NaCl solution and the linear stack of 6 honeycomb flow-through electrodes yielded current/time response consistent with conventional capacitive devices using individual titanium wires to provide electrical contact to the electrodes.

It will be apparent to those skilled in the art that various modifications and variations can be made to the present invention without departing from the spirit or scope of the invention. Thus, it is intended that the present invention cover the modifications and variations of this invention provided they come within the scope of the appended claims and their equivalents.

What is claimed is:

1. A capacitive device comprising:
   two or more electrodes arranged in series, wherein each electrode comprises a first face, an opposing second face and a thickness defined by an outer surface extending from the first face to the opposing second face;
   a first current collector in electrical contact with the outer surfaces of one or more of the electrodes and insulated from one or more other electrodes through contact with a compliant material disposed between the first current collector and the outer surfaces of the one or more other electrodes; and a second current collector in electrical contact with one or more of the electrodes insulated from the first current collector.

2. The capacitive device according to claim 1, wherein the second current collector is insulated from one or more electrodes contacting the first current collector through contact with a compliant material disposed between the second current collector and the one or more electrodes contacting the first current collector.

3. The capacitive device according to claim 1, wherein the electrode material is selected from a carbon, a carbon-based composite, a carbon-based laminate, a conductive metal oxide and combinations thereof.

4. The capacitive device according to claim 1, wherein the compliant material covers from 25 percent to 75 percent of the outer surface of each electrode on which it is disposed.

5. The capacitive device according to claim 1, wherein the outer surfaces of the electrodes are circular and the compliant material covers from 45 degrees to 315 degrees of the circumference of the outer surfaces.

6. The capacitive device according to claim 5, wherein the compliant material covers from 60 degrees to 180 degrees of the circumference of the outer surfaces.

7. The capacitive device according to claim 1, wherein the compliant material for each electrode in a pair of adjacent electrodes is oriented on diametrically opposed portions of the electrodes with respect to each other.

8. The capacitive device according to claim 1, wherein the compliant material is selected from a sheet, a bead, a film and combinations thereof.

9. The capacitive device according to claim 1, wherein the compliant material is selected from a silicone, an elastomer, natural rubber, silicone rubber, butyl rubber, polybutadiene, nitrile rubber, polyurethane rubber, fluoroelastomers and combinations thereof.

10. The capacitive device according to claim 1, wherein the first current collector and the second current collector are, independently, a material selected from nickel, carbon, graphite, titanium, aluminum, nickel, copper, silver, gold, platinum and combinations thereof.

11. The capacitive device according to claim 10, wherein the first current collector and the second current collector are in the form of a compliant sheet.

12. The capacitive device according to claim 1, further comprising an electrically insulating spacer disposed between each adjacent electrode pair.

13. The capacitive device according to claim 12, wherein the electrically insulating spacer is selected from a ring, a plurality of discrete discs, a grid and combinations thereof.

14. The capacitive device according to claim 12, wherein the electrically insulating spacer is bonded to at least one electrode in the adjacent electrode pair.

15. The capacitive device according to claim 1, wherein each electrode is a flow-through electrode.

16. The capacitive device according to claim 15, wherein each electrode comprises a plurality of inner channels having surfaces defined by porous walls and extending through the electrode from the first face to the second face.

17. The capacitive device according to claim 16, wherein each electrode is a honeycomb monolith.

18. The capacitive device according to claim 1, wherein each electrode comprises two halves and an electrically conductive porous backplane disposed between and mechanically attaching the two halves.

19. The capacitive device according to claim 18, wherein the porous backplane is a wire mesh.

20. The capacitive device according to claim 19, wherein the wire mesh is a material selected from titanium, aluminum, nickel, copper, silver, gold, platinum and combinations thereof.

21. The capacitive device according to claim 1, further comprising an outer housing for applying a compressive force to the outer surfaces of the two or more electrodes, the current collector, and the compliant material.

* * * * *